(12) United States Patent
Regev et al.

(10) Patent No.: US 12,445,877 B2
(45) Date of Patent: Oct. 14, 2025

(54) SIGNALING OF NETWORK ENTITIES' PHASE NOISE INTER-CARRIER INTERFERENCE ORDER FOR REDUCING USER EQUIPMENT PHASE NOISE CANCELLATION COMPLEXITY

(71) Applicant: QUALCOMM Incorporated, San Diego, CA (US)

(72) Inventors: Aviv Regev, Tel Aviv (IL); Yaniv Eistein, Tel Aviv (IL); Peer Berger, Hod Hasharon (IL); Ronen Shaked, Kfar Saba (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 18/313,890

(22) Filed: May 8, 2023

(65) Prior Publication Data
US 2024/0381133 A1    Nov. 14, 2024

(51) Int. Cl.
*H04W 24/08*    (2009.01)
(52) U.S. Cl.
CPC .................................. *H04W 24/08* (2013.01)
(58) Field of Classification Search
CPC .... H04W 24/08; H04B 15/02; H04L 27/2613; H04L 27/2657; H04L 5/0091; H04L 5/0023; H04L 5/003; H04L 1/0003
See application file for complete search history.

(56) References Cited

U.S. PATENT DOCUMENTS

2018/0097593 A1*  4/2018  Da Silva ............... H04L 1/0083
2020/0008228 A1   1/2020  Lee et al.
2021/0167904 A1   6/2021  Vieira et al.
2022/0408289 A1* 12/2022  Soltani .................. H04L 5/0051
2023/0344682 A1* 10/2023  Ma ..................... H04L 25/03006

FOREIGN PATENT DOCUMENTS

| CN | 101257470 A | 9/2008 |
|---|---|---|
| WO | WO-2022207960 A1 | 10/2022 |
| WO | WO-2023006432 A1 | 2/2023 |

OTHER PUBLICATIONS

International Search Report and Written Opinion—PCT/US2024/017694—ISA/EPO—Jun. 14, 2024.

* cited by examiner

*Primary Examiner* — Kevin T Bates
*Assistant Examiner* — Hector Reyes
(74) *Attorney, Agent, or Firm* — Qualcomm/Norton Rose Fulbright US LLP

(57) ABSTRACT

This disclosure provides systems, methods, and devices for wireless communication that support signaling of network entities' phase noise inter-carrier interference (ICI) order for reducing user equipment (UE) phase noise cancelation complexity. In a first aspect, a method of wireless communication includes obtaining a power spectral density (PSD) measurement of a phase noise mask of a network entity prior to deployment in the field. The network entity, after deployment, measures an integrated residual PSD measurement per candidate phase noise bandwidth size and transmits these integrated residual PSD measurements to a UE. The UE may then use the integrated residual PSD measurements to estimate phase noise for cancelation from network entity transmissions. Other aspects and features are also claimed and described.

9 Claims, 10 Drawing Sheets

SIGNALING OF NETWORK ENTITIES' PHASE NOISE INTER-CARRIER INTERFERENCE ORDER FOR REDUCING USER EQUIPMENT PHASE NOISE CANCELLATION COMPLEXITY

TECHNICAL FIELD

Aspects of the present disclosure relate generally to wireless communication systems, and more particularly, to user equipment (UE) estimation and cancelation of network entity phase noise. Some features may enable and provide improved communications, including signaling of a network entities' phase noise inter-carrier interference order for reducing UE phase noise cancelation complexity.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station or other network entity. When receiving communications from a serving base station or other network entity, a UE may estimate the phase noise on the communication link to cancel that noise from the communication.

A network entity may transmit data and control information on a downlink to a UE or may receive data and control information on an uplink from the UE. On the downlink, a transmission from the network entity may encounter interference due to transmissions from neighbor network entities or from other wireless radio frequency (RF) transmitters. On the uplink, a transmission from the UE may encounter interference from uplink transmissions of other UEs communicating with the neighbor network entities or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes obtaining a power spectral density (PSD) measurement of a phase noise mask of the network entity, measuring an integrated residual PSD measurement of the PSD measurement corresponding to each phase noise bandwidth size of a plurality of phase noise bandwidth sizes within the phase noise mask, and transmitting the integrated residual PSD measurement corresponding to each phase noise bandwidth size of the plurality of phase noise bandwidth sizes to each user equipment (UE) served by the network entity.

In an additional aspect of the disclosure, a method for wireless communication includes receiving a communication from a serving network entity that includes an integrated residual PSD measurement corresponding to each phase noise bandwidth size of a plurality of phase noise bandwidth sizes, calculating a desired error vector magnitude (EVM) of an intended uplink transmission, identifying a desired integrated residual PSD measurement from the integrated residual PSD measurement associated with the desired EVM, selecting a desired phase noise bandwidth size from the plurality of phase noise bandwidth sizes corresponding to the desired integrated residual PSD measurement, calculating an estimated phase noise of the serving network entity using the desired phase noise bandwidth size, and canceling the estimated phase noise from transmissions received from the serving network entity.

In an additional aspect of the disclosure, an apparatus includes means for obtaining a PSD measurement of a phase noise mask of the network entity, means for measuring an integrated residual PSD measurement of the PSD measurement corresponding to each phase noise bandwidth size of a plurality of phase noise bandwidth sizes within the phase noise mask, and means for transmitting the integrated residual PSD measurement corresponding to each phase noise bandwidth size of the plurality of phase noise bandwidth sizes to each UE served by the network entity.

In an additional aspect of the disclosure, an apparatus includes means for receiving a communication from a serving network entity that includes an integrated residual PSD measurement corresponding to each phase noise bandwidth size of a plurality of phase noise bandwidth sizes, means for calculating a desired EVM of an intended uplink transmission, means for identifying a desired integrated residual PSD measurement from the integrated residual PSD measurement associated with the desired EVM, means for selecting a desired phase noise bandwidth size from the plurality of phase noise bandwidth sizes corresponding to the desired integrated residual PSD measurement, means for calculating an estimated phase noise of the serving network entity using the desired phase noise bandwidth size, and means for canceling the estimated phase noise from transmissions received from the serving network entity.

In an additional aspect of the disclosure, a non-transitory computer-readable medium stores instructions that, when executed by a processor, cause the processor to perform operations. The operations include obtaining a PSD measurement of a phase noise mask of the network entity, measuring an integrated residual PSD measurement of the PSD measurement corresponding to each phase noise bandwidth size of a plurality of phase noise bandwidth sizes within the phase noise mask, and transmitting the integrated residual PSD measurement corresponding to each phase noise bandwidth size of the plurality of phase noise bandwidth sizes to each UE served by the network entity.

In an additional aspect of the disclosure, a non-transitory computer-readable medium stores instructions that, when executed by a processor, cause the processor to perform operations. The operations include receiving a communication from a serving network entity that includes an integrated residual PSD measurement corresponding to each phase noise bandwidth size of a plurality of phase noise bandwidth sizes, calculating a desired EVM of an intended uplink transmission, identifying a desired integrated residual PSD measurement from the integrated residual PSD measurement associated with the desired EVM, selecting a desired phase noise bandwidth size from the plurality of phase noise bandwidth sizes corresponding to the desired integrated residual PSD measurement, calculating an estimated phase noise of the serving network entity using the desired phase noise bandwidth size, and canceling the estimated phase noise from transmissions received from the serving network entity.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
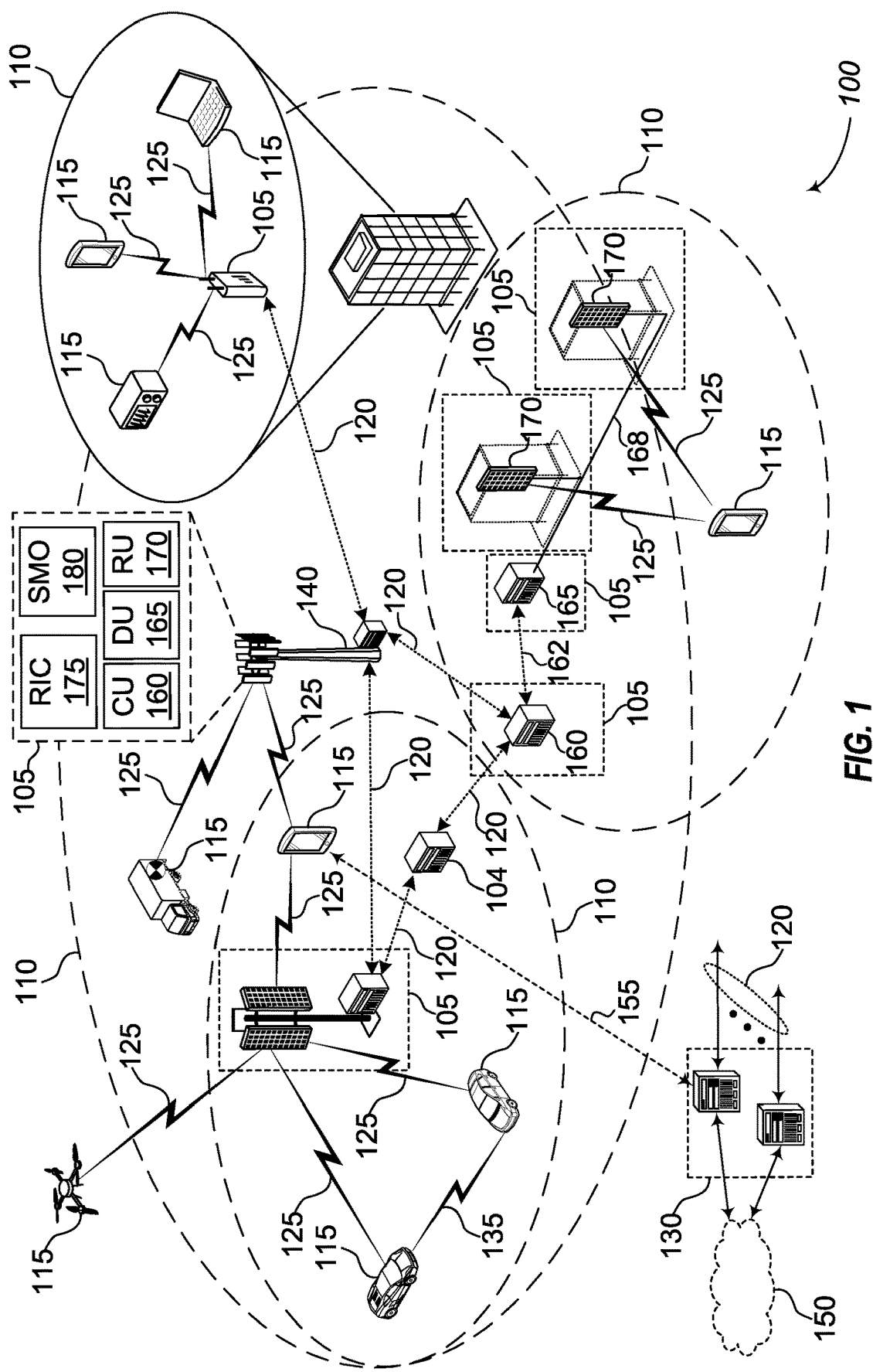
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support signaling of network entities' phase noise ICI order for reducing UE phase noise cancelation complexity. Particular implementations of the subject matter described in this disclosure may be implemented to realize one or more of the following potential advantages or benefits. In some aspects, the present disclosure provides techniques for signaling of network entities' phase noise ICI order for reducing UE phase noise cancelation complexity. By signaling the network entities' phase noise ICI, the UE may more accurately estimate the phase noise on the channel and, therefore, may more accurately cancel the phase noise from received transmissions. Instead of estimating phase noise based on the phase noise within the phase noise bandwidth, which ignores the residual phase noise power spectral density (PSD) in the phase noise mask, the aspects described herein use the additional signaling of residual phase noise PSD as a part of the phase noise estimation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 illustrates an example of a wireless communications system 100 that supports RF component preferences in hybrid beamforming operations at mmWave bands in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, the network entity 105 may be referred to as a network element, a mobility element, a radio access network (RAN) node, or network equipment, among other nomenclature. In some examples, the network entities 105 and the UEs 115 may wirelessly communicate via one or more communication links 125 (e.g., a radio frequency (RF) access link).

The UEs 115 may be dispersed throughout the coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be the network entity 105 (e.g., any network entity described herein), the UE 115 (e.g., any UE described herein), a network controller, an apparatus, a device, a computing system, one or more components, or another suitable processing entity configured to perform any of the techniques described herein. For example, a node may be the UE 115. As another example, a node may be the network entity 105.

In some examples, the network entities 105 may communicate with the core network 130, or with one another, or both. For example, the network entities 105 may communicate with the core network 130 via one or more backhaul communication links 120 (e.g., in accordance with an S1, N2, N3, or other interface protocol). In some examples, the network entities 105 may communicate with one another over the backhaul communication link 120 (e.g., in accordance with an X2, Xn, or other interface protocol) either directly (e.g., directly between the network entities 105) or indirectly (e.g., via the core network 130). In some examples, the network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, the midhaul communication links 162, or the fronthaul communication links 168 may be or include one or more wired links (e.g., an electrical link, an optical fiber link), one or more wireless links (e.g., a radio link, a wireless optical link), among other examples or various combinations thereof. The UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a transmission-reception point (TRP), a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, the network entity 105 (e.g., the base station 140) may be implemented in an aggregated (e.g., monolithic, standalone) base station architecture, which may be configured to utilize a protocol stack that is physically or logically integrated within a single network entity 105 (e.g., a single RAN node, such as the base station 140).

In some examples, the network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, the network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. The RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The UE 115 may include or may be referred to as a mobile device, a wireless device, a remote device, a handheld device, or a subscriber device, or some other suitable terminology, where the "device" may also be referred to as a unit, a station, a terminal, or a client, among other examples. The UE 115 may also include or may be referred to as a personal electronic device such as a cellular phone, a personal digital assistant (PDA), a tablet computer, a laptop computer, or a personal computer. In some examples, the UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, a satellite radio, a global positioning system (GPS) device, a global navigation satellite system (GNSS) device, a logistics controller, an unmanned aerial vehicle (UAV), a drone, a smart energy or security device, a solar panel or solar array, etc. among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific one of the UEs 115.

In some examples, the UE 115 may be able to communicate directly with other of the UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of the network entity 105 (e.g., the base station 140, the RU 170), which may support aspects of such D2D communications being configured by or scheduled by the network entity 105. In some examples, one or more UEs 115 in such a group may be outside of the coverage area 110 of the network entity 105 or may be otherwise unable to or not configured to receive transmissions from the network entity 105. In some examples, groups of the UEs 115 communicating via D2D communications may support a one-to-many (1:M) system in which each UE 115 transmits to each of the other ones of the UEs 115 in the group. In some examples, the network entity 105 may facilitate the scheduling of resources for D2D communications. In some other examples, D2D communications may be carried out between the UEs 115 without the involvement of the network entity 105.

In some systems, the D2D communication link 135 may be an example of a communication channel, such as a sidelink communication channel, between vehicles (e.g., the UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., the network entities 105, the base stations 140, the RUs 170) using vehicle-to-network (V2N) communications, or with both.

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between the UE 115 and the network entity 105 or the core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., the communication link 125, the D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

Figure 2:
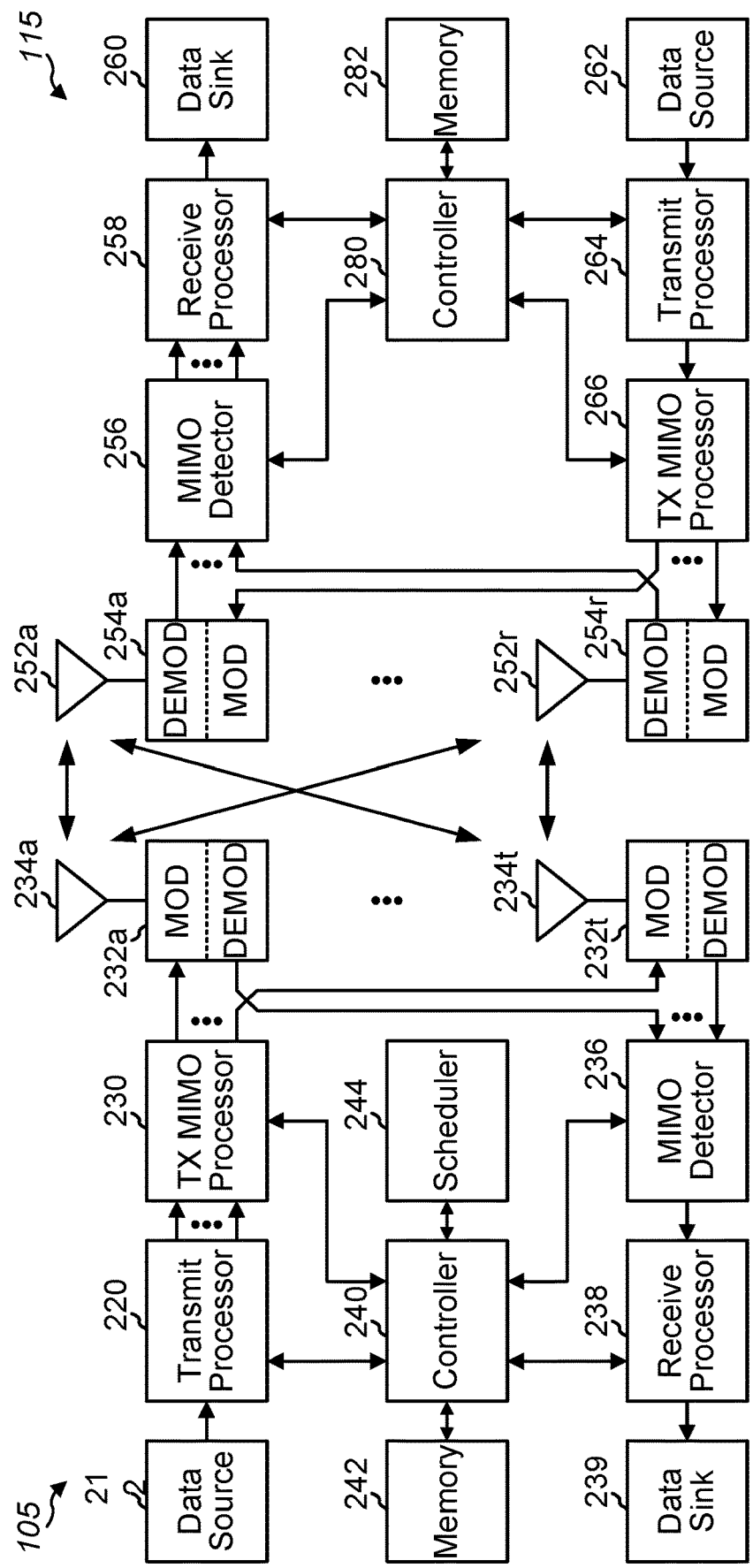
FIG. 2 is a block diagram illustrating examples of a base station and a user equipment (UE) according to one or more aspects.

FIG. 2 is a block diagram illustrating examples of the base station 140 and the UE 115 according to one or more aspects. The base station 140 and the UE 115 may be any of the network entities and base stations and one of the UEs in FIG. 1. For a restricted association scenario (as mentioned above), the network entity 105 may be small cell base station, and the UE 115 may be the UE 115 operating in a service area of the small cell base station, which in order to access the small cell base station, would be included in a list of accessible UEs for the small cell base station. The base station 140 may also be a base station of some other type. As shown in FIG. 2, a network entity 105, such as the base station 140 may be equipped with the antennas 234a through 234t, and the UE 115 may be equipped with the antennas 252a through 252r for facilitating wireless communications.

At the base station 140, the transmit processor 220 may receive data from the data source 212 and control information from the controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, the transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. The transmit (TX) MIMO processor 230 may perform spatial processing (e.g., precoding) on the data symbols, the control symbols, or the reference symbols, if applicable, and may provide output symbol streams to the modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from the modulators 232a through 232t may be transmitted via the antennas 234a through 234t, respectively.

At the UE 115, the antennas 252a through 252r may receive the downlink signals from the base station 140 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. The MIMO detector 256 may obtain received symbols from the demodulators 254a through 254r, perform MIMO detection on the received symbols if applicable, and provide detected symbols. The receive processor 258 may process (e.g., demodulate, deinterleave, and decode) the detected symbols, provide decoded data for the UE 115 to the data sink 260, and provide decoded control information to the controller 280, such as a processor.

On the uplink, at the UE 115, the transmit processor 264 may receive and process data (e.g., for a physical uplink shared channel (PUSCH)) from the data source 262 and control information (e.g., for a physical uplink control channel (PUCCH)) from the controller 280. Additionally, the transmit processor 264 may also generate reference symbols for a reference signal. The symbols from the transmit processor 264 may be precoded by the TX MIMO processor 266 if applicable, further processed by the modulators 254a through 254r (e.g., for SC-FDM, etc.), and transmitted to network entity 105. At the network entity 105, the uplink signals from the UE 115 may be received by the antennas 234, processed by the demodulators 232, detected by the MIMO detector 236 if applicable, and further processed by the receive processor 238 to obtain decoded data and control information sent by the UE 115. The receive processor 238 may provide the decoded data to the data sink 239 and the decoded control information to the controller 240.

The controllers 240 and 280 may direct the operation at the base station 140 and the UE 115, respectively. The controller 240 or other processors and modules at the base station 140 or the controller 280 or other processors and modules at the UE 115 may perform or direct the execution of various processes for the techniques described herein, such as to perform or direct the execution illustrated in FIGS. 4A and 4B, or other processes for the techniques described herein. The memories 242 and 282 may store data and program codes for the base station 140 and the UE 115, respectively. The scheduler 244 may schedule UEs for data transmission on the downlink or the uplink.

Network entity phase noise may significantly impair the RF channel for a UE to handle in downlink communication from the network entity. Phase noise impairment can become harsher as the carrier frequency increases (e.g., sub6=>mmW=>subTHz). Network entities generally calibrate the phase noise to enable reception of a legacy quadrature amplitude modulation (QAM) (up to 256). However, the next generation of radio access technologies (e.g., 5G, 6G, XG, etc.) may progress towards what have been referred to as "super-QAM" modulations or modulations of 4K or even 16K QAM. To enable demodulation of such high-order constellations, the desired signal-to-noise ratio (SNR) should be very high. As such, the phase noise impairment issue could be the limiting noise floor if it remains untreated.

Next generation, advanced UE receivers may estimate the phase noise process and cancel it from transmission received from the serving network entity. In this advanced receiver, the phase noise cancellation may be performed regardless of the phase noise mask supported. A phase noise mask represents the aggregate influence of phase noise over a particular bandwidth, which bandwidth may be unlimited. The cancellation process involves the UE first estimating the experienced phase noise samples, such as on the pilot signals from the network entity, followed by removal of this estimated phase noise from any data received from the network entity (e.g., PDSCH).

In the estimation process, the UE would assume a typical phase noise bandwidth, within the bandwidth of the phase noise mask, usually in terms of subcarriers, and estimates the number of subcarriers inside the assumed bandwidth. Because the phase mask bandwidth may be unlimited, the UE phase noise estimation might improve as much as the assumed bandwidth extends. However, the phase noise mask may generally decay at higher frequencies. Because of this decay at higher frequencies, including these higher frequencies in the phase noise mask might barely influence the UE estimation quality. Additionally, including too many parameters in the estimate calculation may damage the UE estimation accuracy, and, further, may increase power consumption, complexity, and latency of the estimation and correction process.

Various aspects of the present disclosure address these issues in the phase noise estimation by sharing the network phase noise bandwidth information to the served UEs having the estimation and cancelation capability. The network entity may share a table of the expected integrated residual phase noise power spectral density (PSD) for each of several phase noise bandwidth sizes that it will advise. Thus, the UE can choose, according to a desired SNR to demodulate the signal, the phase noise bandwidth size to apply based on the information received from the network entity and avoid waste of excessive power consumption, latency, and mismatch modeling errors.

Figure 3:
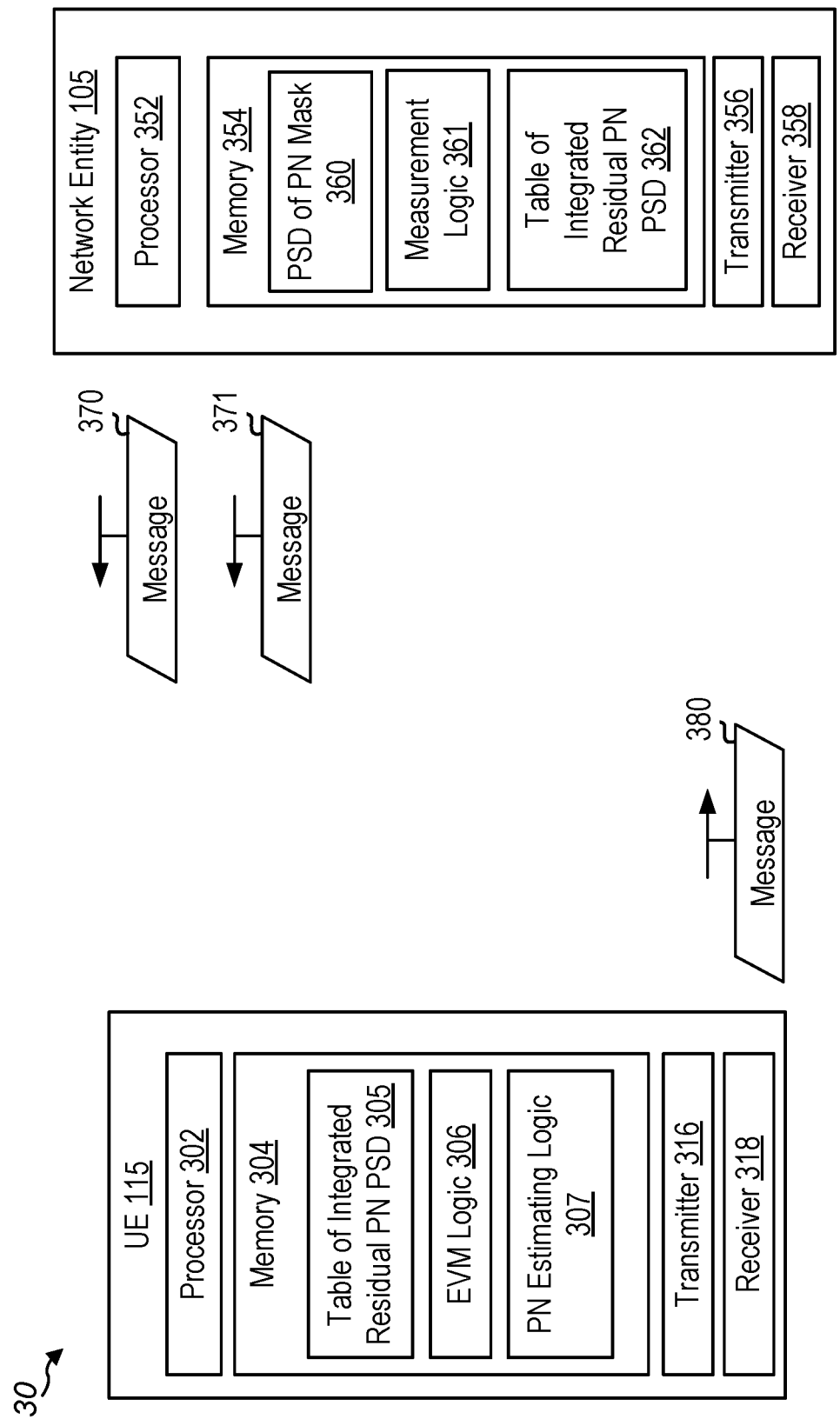
FIG. 3 is a block diagram illustrating an example wireless communication system that supports signaling of network entities' phase noise ICI order for reducing UE phase noise cancelation complexity according to one or more aspects.

FIG. 3 is a block diagram of an example wireless communications system 30 that supports signaling of network entities' phase noise ICI order for reducing UE phase noise cancelation complexity according to one or more aspects. In some examples, wireless communications system 30 may implement aspects of wireless network 100. Wireless communications system 30 includes UE 115 and network entity 105. Although one UE 115 and one network entity 105 are illustrated, in some other implementations, wireless communications system 30 may generally include multiple UEs 115, and may include more than one network entity 105.

Network entity 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store PSD of PN mask 360, measurement logic 361, and table of integrated residual PN PSD 362. During the manufacturing and testing process, prior to deployment of network entity 105, instruments measure the PSD of the PN mask of network entity 105. This measurement information is then stored at PSD of PN mask 360 prior to deployment. Measurement logic 361 includes the code and instructions, which, when executed under control of processor 352 (referred to herein as the "execution environment" of measurement logic 361), implements the features and functional for measuring various elements at network entity 105. One such element to be measured is the integrated residual phase noise (PN) PSD for a given phase noise bandwidth. This integrated residual PN PSD may represent the ICI order at network entity 105. Network entity 105, within the execution environment of measurement logic 361 may measure an integrated residual phase noise PSD for multiple, candidate phase noise bandwidths. Under control of processor 352, network entity 105 may store each measured integrated residual phase noise PSD in a table, indexed by the corresponding phase noise bandwidth, as table of integrated residual PN PSD 362.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of network entity 105 described with reference to FIG. 2.

Under control of processor 352, network entity 105 may transmit a control message to UE 115, message 370, which includes the table of integrated residual phase noise PSD from table of integrated residual PN PSD 362.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store table integrated residual PN PSD 305, EVM logic 306, and PN estimating logic 307. Table of integrated residual PN PSD 305 includes a table of integrated residual phase noise PSD received from network entity 105.

The table is indexed according to the corresponding phase noise bandwidth, either represented in subcarriers, frequency, or the like. EVM logic 306, when executed by processor 302, implements the functionality for UE 115 to determine a desired EVM for a particular transmission or MCS or uplink transmission, such as message 380, and then select a phase noise bandwidth, from table of integrated residual PN PSD 305, in which the corresponding integrated residual phase noise PSD would be considered negligible in relation to the desired EVM. PN estimating logic 307, when executed by processor 302, implements the functionality for UE 115 to estimate the phase noise for a given transmission and cancel that phase noise from the transmission. For example, when network entity 105 transmits data in message 371, the estimated phase noise determined within the execution environment of PN estimating logic 307, is further canceled from message 371.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

In some implementations, wireless communications system 30 implements a 5G NR network. For example, wireless communications system 30 may include multiple 5G-capable UEs 115 and multiple 5G-capable network entities 105, such as UEs, network entities, or base stations configured to operate in accordance with a 5G NR network protocol such as that defined by the 3GPP.

During operation of wireless communications system 30, network entity 105 determines a table of phase noise PSD within the execution environment of measurement logic 361, and transmits the table, from table of integrated residual PN PSD 362 to UE 115 via message 370. UE 115 receives and stores the table in memory 304 at table of integrated residual PN PSD. UE 115 may calculate a desired EVM and select a phase noise bandwidth, within the execution environment of EVM logic 306, using the table of integrated PN PSD 362. UE 115 may then estimated the phase noise using the selected phase noise bandwidth and then cancel the estimated phase noise from a transmission, such as message 371, from network entity 105.

As described with reference to FIG. 3, the present disclosure provides techniques for signaling of network entities' phase noise ICI order for reducing UE phase noise cancelation complexity. By signaling the network entities' phase noise ICI, the UE may more accurately estimate the phase noise on the channel and, therefore, may more accurately cancel the phase noise from received transmissions. Instead of estimating phase noise based on the phase noise within the phase noise bandwidth, which ignores the residual phase noise power spectral density (PSD) in the phase noise mask, the aspects described herein use the additional signaling of residual phase noise PSD as a part of the phase noise estimation.

Figure 4A:
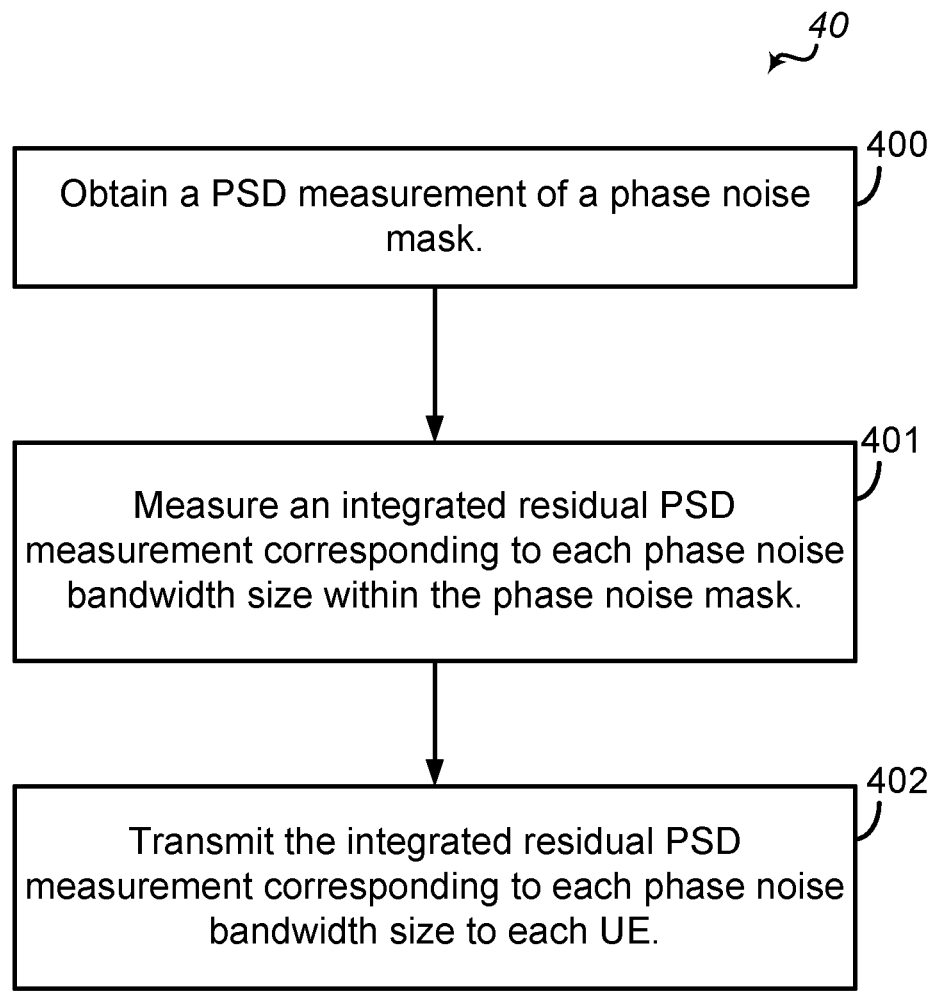
FIG. 4A is a flow diagram illustrating an example process that supports signaling of network entities' phase noise ICI order for reducing UE phase noise cancelation complexity according to one or more aspects.

FIG. 4A is a flow diagram illustrating an example process 40 that supports signaling of network entities' phase noise ICI order for reducing UE phase noise cancelation complexity according to one or more aspects. Operations of process 40 may be performed by a network entity, such as network entity 105 or base station 140 described above with reference to FIGS. 1-3 or a network entity 105 as described above with reference to FIG. 7. For example, example operations of process 40 may enable network entity 105 to support signaling of network entities' phase noise ICI order for reducing UE phase noise cancelation complexity.

At block 400, the network entity obtains a PSD measurement of a phase noise mask of the network entity. The network entity may obtain the PSD measurement during the manufacturing and testing process, prior to deployment in the field. Within that process, instruments, such as a spectrum analyzer may measure the PSD and store that PSD measurement before deployment.

At block 401, the network entity measures an integrated residual PSD measurement of the PSD measurement corresponding to each phase noise bandwidth size of a plurality of phase noise bandwidth sizes within the phase noise mask. When in communication with a UE or at the beginning of communications with a UE, the network entity may measure the integrated residual phase noise PSD on a per phase noise bandwidth basis. For each such integrated residual phase noise PSD, the UE creates a table indexed by the corresponding phase noise bandwidth.

At block 402, the network entity transmits the integrated residual PSD measurement corresponding to each phase noise bandwidth size of the plurality of phase noise bandwidth sizes to each UE served by the network entity. The network entity may transmit the table of integrated residual phase noise PSD to the UE in a control signal, such as a MAC-layer or RRC-layer signaling.

Figure 4B:
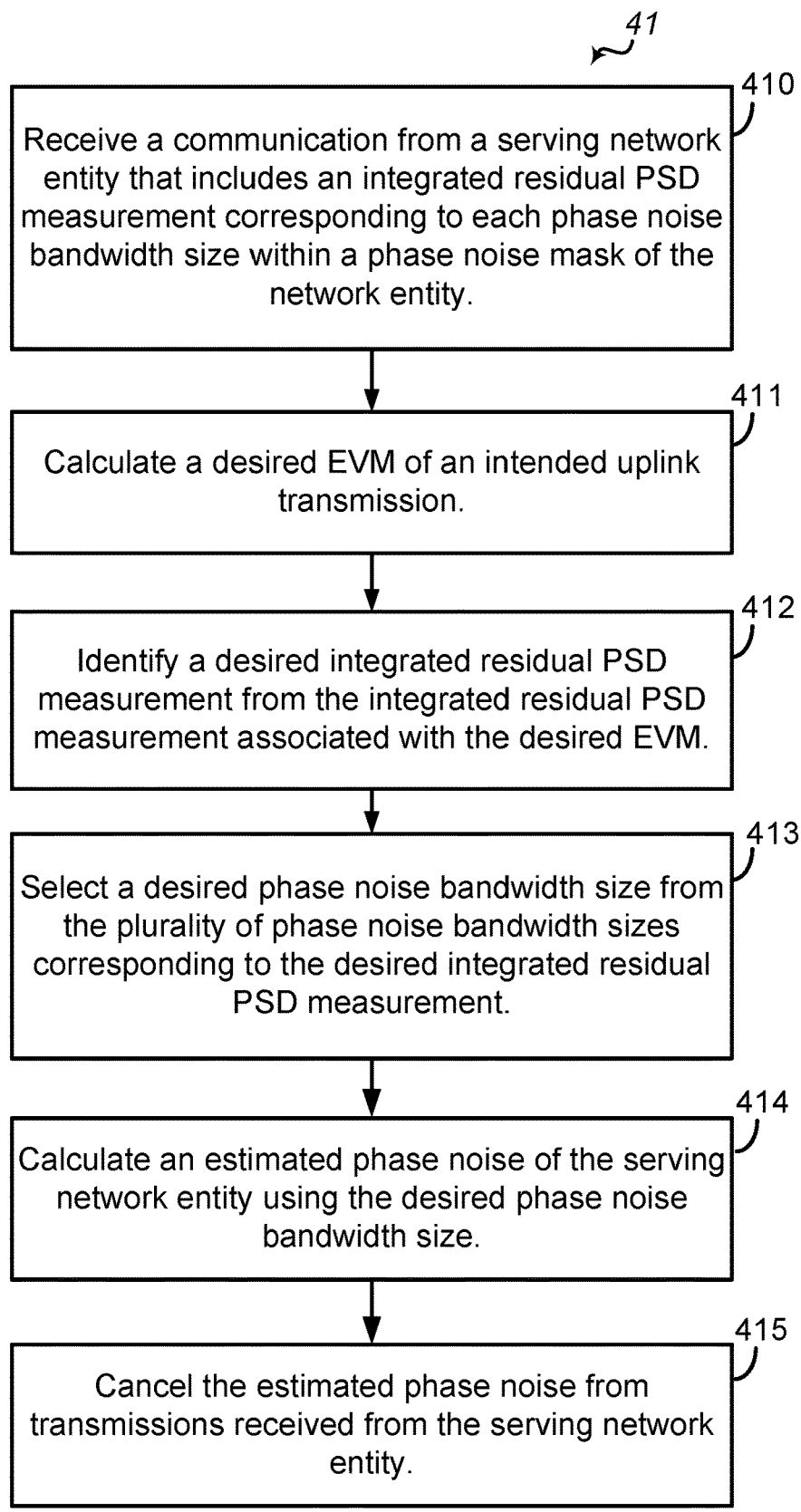
FIG. 4B is a flow diagram illustrating an example process that supports signaling of network entities' phase noise ICI order for reducing UE phase noise cancelation complexity according to one or more aspects.

FIG. 4B is a flow diagram illustrating an example process 41 that supports signaling of network entities' phase noise ICI order for reducing UE phase noise cancelation complexity according to one or more aspects. Operations of process 41 may be performed by a UE, such as UE 115 described above with reference to FIGS. 1-3, or a UE 115 described with reference to FIG. 8. For example, example operations (also referred to as "blocks") of process 41 may enable UE 115 to support signaling of network entities' phase noise ICI order for reducing UE phase noise cancelation complexity.

At block 410, the UE receives a communication from a serving network entity that includes an integrated residual PSD measurement corresponding to each phase noise bandwidth size of a plurality of phase noise bandwidth sizes. The integrated residual PSD measurement may come in the form of a table of integrated residual phase noise PSD measurements indexed by the corresponding phase noise bandwidth resulting in the residual measurement.

At block 411, the UE calculates a desired EVM of an intended uplink transmission. The UE may calculate or have a table or relationship of desired EVMs for a particular MCS. The UE may then determine the EVM based on the intended MCS or transmission.

At block 412, the UE identifies a desired integrated residual PSD measurement from the integrated residual PSD measurement associated with the desired EVM. The UE identifies the desired integrated residual PSD measurement my comparing the desired EVM to the integrated residual PSD measurements in the table from the network entity. When the integrated residual PSD measurements of the table appear to be negligible in comparison with the desired EVM, the UE will identify that integrated residual PSD measurement as the desired measurement.

At block 413, the UE selects a desired phase noise bandwidth size from the plurality of phase noise bandwidth sizes corresponding to the desired integrated residual PSD measurement. Within the table, the phase noise bandwidths index the integrated residual PSD measurements. Therefore, when the desired integrated residual PSD measurement is determined, the UE selects the phase noise bandwidth corresponding to the desired integrated residual PSD measurement.

At block 414, the UE calculates an estimated phase noise of the serving network entity using the desired phase noise bandwidth size. The desired phase noise bandwidth is used in the phase noise estimation process. As the desired phase noise bandwidth from the table includes an accounting for the integrated residual phase noise PSD, the UE's phase noise estimation may be more accurate.

At block 415, the UE cancels the estimated phase noise from transmissions received from the serving network entity. Once the estimated phase noise is determined using the accommodation of the integrated residual phase noise PSD that is associated with the desired EVM, the UE can cancel this phase noise from data transmissions received from the network entity.

Figure 5A:
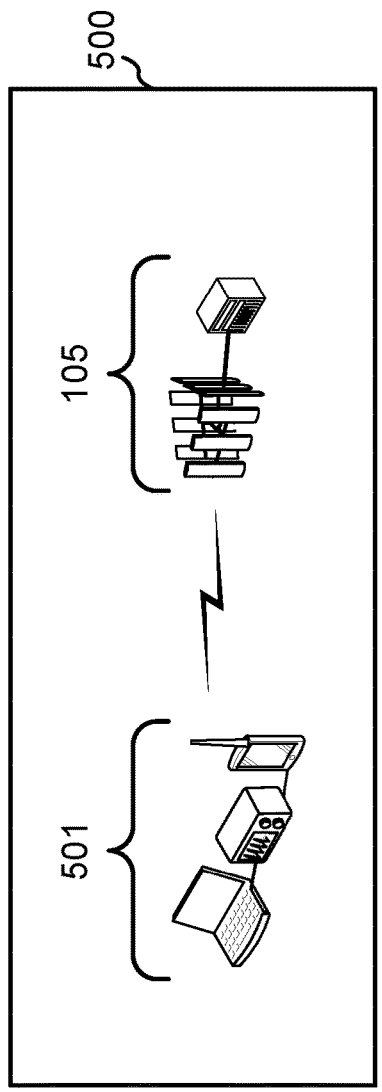
FIGS. 5A-5C are block diagrams illustrating a manufacturing facility, a wireless communications systems that includes a network entity and UE, and a phase noise mask of the network entity, where the network entity and UE are each configured to support signaling of network entities' phase noise ICI order for reducing UE phase noise cancelation complexity according to one or more aspects.
Figure 5B:
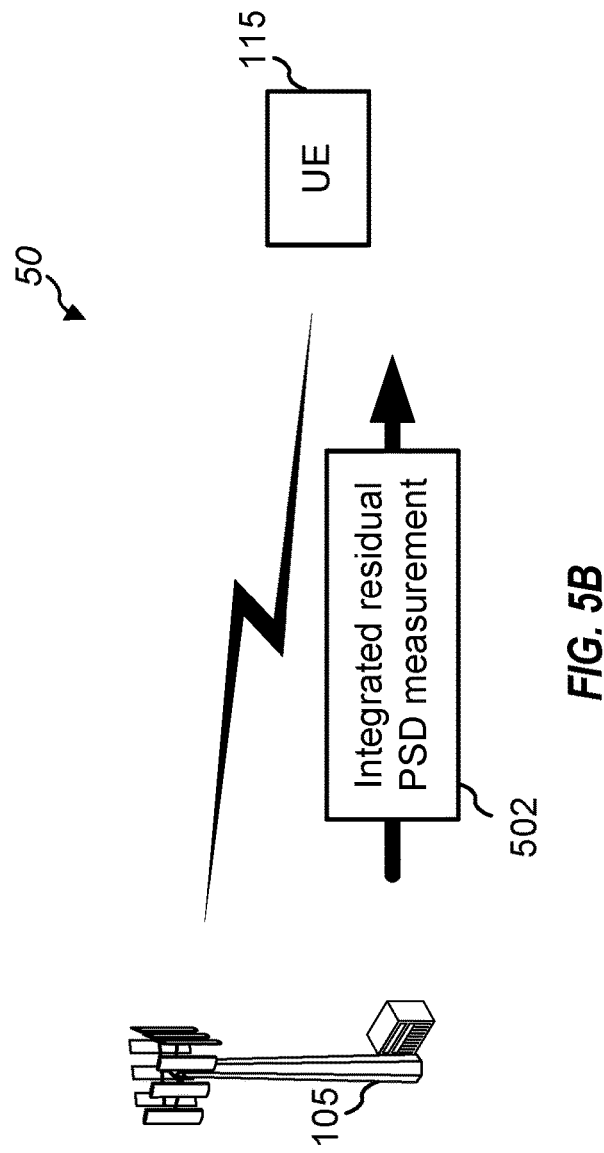
Figure 5C:
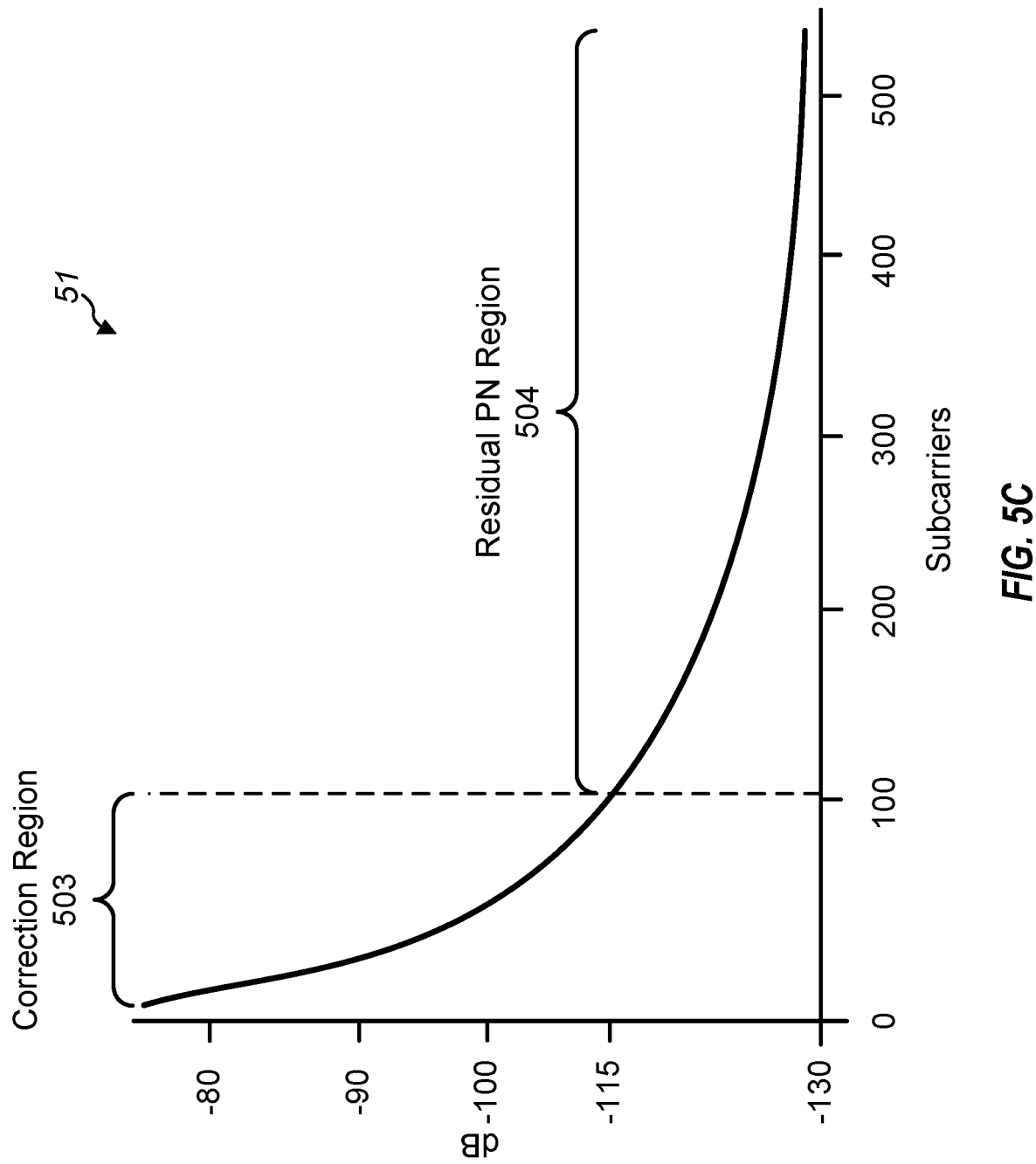

FIGS. 5A-5C are block diagrams illustrating manufacturing facility 500, a wireless communications systems 50 that includes network entity 105 and UE 115, and a phase noise mask of network entity 105, respectively, where network entity 105 and UE 115 are each configured to support signaling of network entities' phase noise ICI order for reducing UE phase noise cancelation complexity according to one or more aspects. The manufacturing and testing lifecycle of network entity 105 is illustrated in FIG. 5A. During the manufacturing and testing process, the transmission phase noise mask of network entity 105 can be measured, at manufacturing facility 500. The manufacturer may use a spectrum analyzer 501 to measure the transmission phase noise characteristics of network entity 105 while offline and in the factory setting of manufacturing facility 500. Spectrum analyzer 501 produces a PSD of network entity 105's phase noise mask. The PSD may represent the distribution of average power in the frequency domain. This information would then be stored at network entity 105 prior to deployment in the field.

At FIG. 5B, network entity 105 has been deployed within wireless communication system 50. When serving a UE, such as UE 115, network entity 105 may convert the predetermined PSD to represent the power distribution over subcarriers instead of the frequency (Hz) with respect to a selected numerology of the network operations. For example in communication operations under a frequency of 6 GHz, representing a numerology=1, the subcarrier spacing (SCS) is 30 KHz. Assuming such operations, network entity 105 may use the converted PSD to represent the phase noise mask, such as phase noise mask 51 of FIG. 5C.

Network entity 105 may measure the integrated residual phase noise PSD outside of the phase noise bandwidth for multiple given phase noise bandwidth sizes. For example, with phase noise mask 51, the phase noise bandwidth size is approximately 102 subcarriers. Correction region 503 represents the portion of phase noise mask 51 within the phase noise bandwidth that may be corrected through phase noise estimation by UE 115. However, the phase noise PSD in residual phase noise region 504 is neglected by UE 115 or assumed to be zero. Thus, the phase noise estimation by UE 115 would typically include an error because the phase noise PSD within residual phase noise region 504 is neglected. In order to address this estimation error at UE 115, network entity 105 would measure the integrated residual phase noise PSD within residual phase noise region 504 on a per phase noise bandwidth size basis and send integrated residual phase noise PSD measurement 502 to UE 115. Network entity 105 would measure the residual phase noise PSD within residual phase noise region 504, measure a new residual phase noise PSD for a next assumed phase noise bandwidth (not shown), and so on, and signal these measurements of residual phase noise PSD per phase noise bandwidth in integrated residual phase noise measurement 502 to UE 115. Network entity 105 may send this information in a table of residual phase noise PSDs indexed by the corresponding phase noise bandwidth. In one example implementation, network entity 105 may send a table, such as Table 1 below, at the media access control (MAC) or RRC level at the beginning of communications with each UE, such as UE 115, which is capable of supporting transmission phase noise estimation.

TABLE 1

| Number of SCs | Integrated Residual PN (db) |
| --- | --- |
| 13 | −35.3 |
| 23 | −39.2 |
| 36 | −42.8 |
| 57 | −45.2 |
| 102 | −48.2 |
| 205 | −51.6 |
| 327 | −53.9 |
| 464 | −55.8 |

UE 115 may then use the table of integrated residual phase noise PSD corresponding to phase noise bandwidth in estimating the phase noise for the communication channel. A UE, such as UE 115, may maintain a table or relationship of sufficient error vector magnitude (EVM) per modulation coding schemes (MCSs). EVM is a modulation quality metric that represents a measurement of the deviation of the actual detected constellation points from their ideal locations in a signal constellation diagram. EVM can be a comprehensive measure of the transmission quality because it reflects signal defects that affect the magnitude or phase of the transmitted symbol. The EVM may also inform UE 115 of a phase noise bandwidth that it may handle in correcting the phase noise. The table or relationship of EVM to MCS may provide the sufficient EVM value to achieve acceptable demodulation at the corresponding MCS. Therefore, in the phase noise estimation process, UE 115 may first determine a desired EVM for a particular MCS. Based on this desired EVM, UE 115 would selected a corresponding phase noise bandwidth. UE 115 uses this phase noise bandwidth to correspond to the number of subcarriers in Table 1 to estimate based on the corresponding integrated residual phase noise PSD.

It should be noted that, UE 115 may, in some scenarios, determine that it cannot correct the phase noise within a corresponding phase noise bandwidth for the desired EVM. In this scenario, UE 115 may signal to network entity 105 that it cannot correct the phase noise in the corresponding phase noise bandwidth and further informs network entity 105 of the maximum phase noise bandwidth that it can correct. In response, network entity 105 could configured a different or lower MCS that corresponds to UE 115's phase noise correction capabilities.

In one example implementation, UE 115 may determine the desired EVM according to the following formula:

$$EVM_{desired} = -[3N + TH]\text{dB} \qquad (1)$$

Where N represents the number of uncoded bits per symbol, in which −3N provides an upper bound comparable to the Shannon capacity approximation, and TH is a guard interval which depends on the system needs. If the signal is 8 bits (e.g., 256 QAM), the desired EVM would be −28 dB (e.g., −[3(8)+4] dB). Comparing this desired EVM to the integrated residual phase noise of Table 1, UE 115 may select 13 subcarriers for the phase noise estimation as the corresponding −35.3 dB integrated residual phase noise PSD would be considered negligible compares to the desired EVM, −28 dB. Similarly, if the signal is 14 bits (e.g., 16384 QAM), the desired EVM would be −46 dB (e.g., −[3(14)+4] dB). Comparing this desired EVM to the integrated residual phase noise PSD of Table 1, UE 115 may select 102 subcarriers (−48.2 dB vs. −46 dB) for phase noise estimation, as the integrated residual phase noise PSD for the lower phase noise bandwidths may not be negligible compared to the desired EVM, −46 dB, and could result in erroneous demodulation. These choices save power consumption and latency, and, at the same time, still ensures a successful demodulation.

Figure 6:
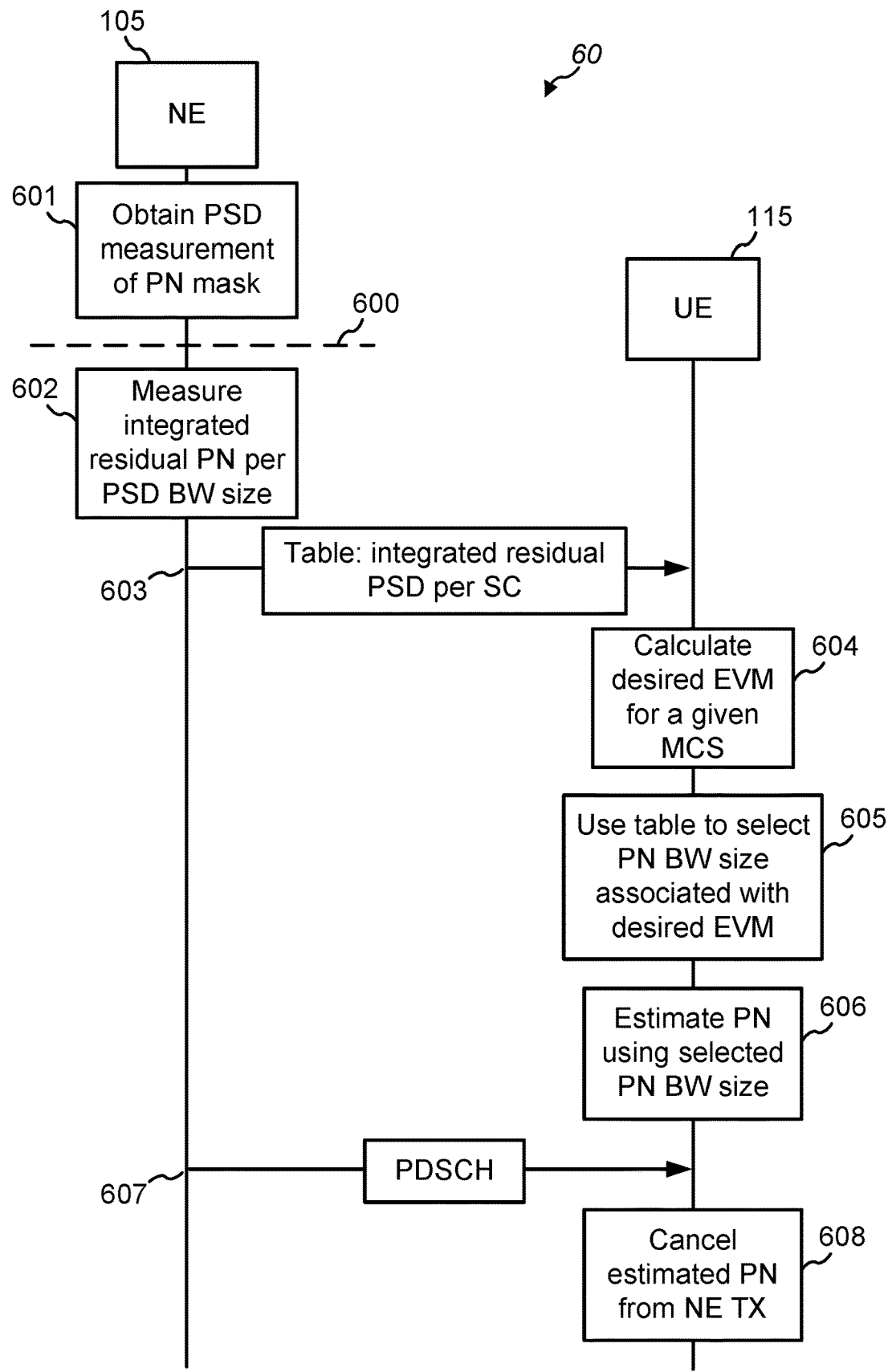
FIG. 6 is a call flow diagram illustrating communications between a network entity and UE each configured to support signaling of network entities' phase noise ICI order for reducing UE phase noise cancelation complexity according to one or more aspects.

FIG. 6 is a call flow diagram 60 illustrating communications between network entity 105 and UE 115 each configured to support signaling of network entities' phase noise ICI order for reducing UE phase noise cancelation complexity according to one or more aspects. Time 600 represents the deployment date for network entity 105. Prior to the deployment at 600, while network entity 105 is in the manufacturing and testing phase, at time 601, instruments, such as a spectrum analyzer, may measure the power spectral density (PSD) of the phase noise mask of network entity 105. This PSD may then be stored at network entity 105.

After deployment, at 600, when network entity 105 is in communication or is beginning communications with UE 115, network entity 105, at 602, measures the integrated residual phase noise PSD on a per phase noise bandwidth basis. Part of this measurement process may include creating a table of integrated residual phase noise PSD indexed by number of subcarriers. At 603, network entity 105 may transmit this table to UE 115. UE 115 may begin the phase noise estimation process by calculating, at 604, the desired EVM for a given MCS. UE 115 may then, at 605, use the table of integrated residual phase noise PSDs to select a particular phase noise bandwidth size (in subcarriers, frequency, etc.) associated with the desired EVM. This selection may be driven by comparing the desired EVM with the integrated residual phase noise PSD to determine whether the integrated residual phase noise PSD may be negligible or not compared with the desired EVM. UE 115 selects the corresponding phase noise bandwidth size corresponding to the integrated residual phase noise PSD that would be negligible considering the desired EVM. Once UE 115 identifies the phase noise bandwidth size, it may conduct the phase noise estimation. At 607, when network entity 105 transmits data, such as via PDSCH, UE 115 would, at 608, cancel the estimated phase noise from the network entity transmission using the phase noise estimation calculated using the integrated residual phase noise PSD provided by network entity 105.

It should be noted that UE 115 may determine a phase noise PSD to be negligible when the phase noise PSD adds less than a system-specific number of Decibels to the overall noise. The overall noise experienced by a UE, such as UE 115, includes the thermal noise and any radio frequency (RF) impairment noise, such as the phase noise PSD. UE 115 determines that the phase noise is negligible according to the following relationship:

$$PN + \text{THERMAL} \approx \text{THERMAL} \qquad (2)$$

Where PN represent the phase noise PSD and THERMAL represents the thermal noise. Thus, where the phase noise does not add significant noise to the overall noise, such that it is essentially the thermal noise. In one example, the thermal noise is −28 dB and the phase noise PSD is −35.2 dB. −35.2 dB+−28 dB=−27.24 dB≈−28 dB. The full Decibel additional would be performed according to the following equation:

$$10 \cdot \log_{10}\left(10^{\left(-\frac{28}{10}\right)} + 10^{\left(-\frac{35.2}{10}\right)}\right) = -27.2425 \text{ dB} \qquad (3)$$

Ultimately, according to the needs of a particular system, UE 115 would consider the phase noise PSD to be negligible when it adds less than a few dB (e.g., 1 dB, 2 dB, etc.) to the overall noise value.

Figure 7:
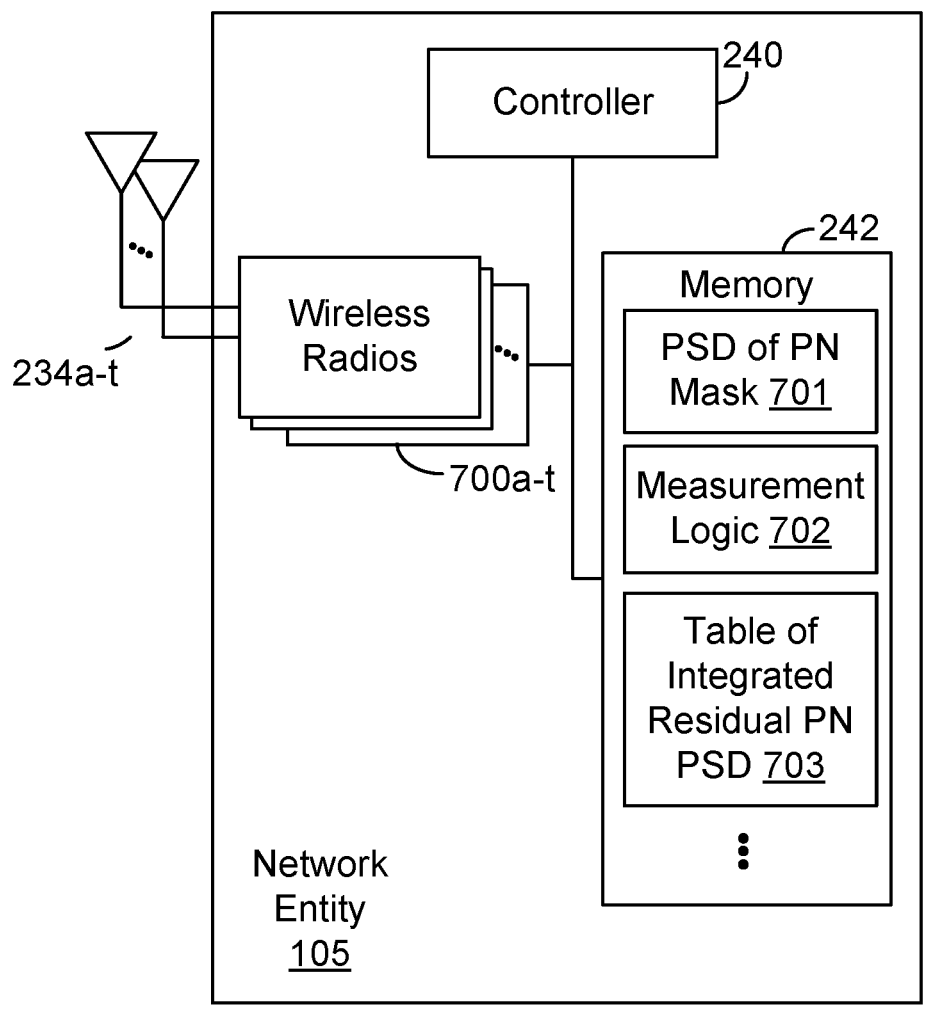
FIG. 7 is a block diagram of an example network entity that supports signaling of network entities' phase noise ICI order for reducing UE phase noise cancelation complexity according to one or more aspects.

FIG. 7 is a block diagram of an example base station 105 that supports signaling of network entities' phase noise ICI order for reducing UE phase noise cancelation complexity according to one or more aspects. Base station 105 may be configured to perform operations, including the blocks of process 40 described with reference to FIG. 4A. In some implementations, base station 105 includes the structure, hardware, and components shown and described with reference to base station 105 of FIGS. 1-3. For example, base station 105 may include controller 240, which operates to execute logic or computer instructions stored in memory 242, as well as controlling the components of base station 105 that provide the features and functionality of base station 105. Base station 105, under control of controller 240, transmits and receives signals via wireless radios 700a-t and antennas 234a-t. Wireless radios 700a-t include various components and hardware, as illustrated in FIG. 2 for base station 105, including modulator and demodulators 232a-t, transmit processor 220, TX MIMO processor 230, MIMO detector 236, and receive processor 238.

As shown, the memory 242 may include PSD of phase noise mask 701, measurement logic 702, and table of integrated residual PN PSD 703. During the manufacturing and testing process, prior to deployment of network entity 105, instruments measure the PSD of the PN mask of network entity 105. This measurement information is then stored at PSD of phase noise mask 701 prior to deployment. Measurement logic 702 includes the code and instructions, which, when executed under control of processor 240, implements the features and functional for measuring various elements at network entity 105. One such element to be measured is the integrated residual phase noise PSD for a given phase noise bandwidth. Network entity 105, within the execution environment of measurement logic 702 may measure an integrated residual phase noise PSD for multiple, candidate phase noise bandwidths. Under control of processor 240, network entity 105 may store each measured integrated residual phase noise PSD in a table, indexed by the corresponding phase noise bandwidth, as table of integrated residual PN PSD 703. Network entity 105 may receive signals from or transmit signals to one or more UEs, such as UE 115 of FIGS. 1-3 or UE 115 of FIG. 8.

Figure 8:
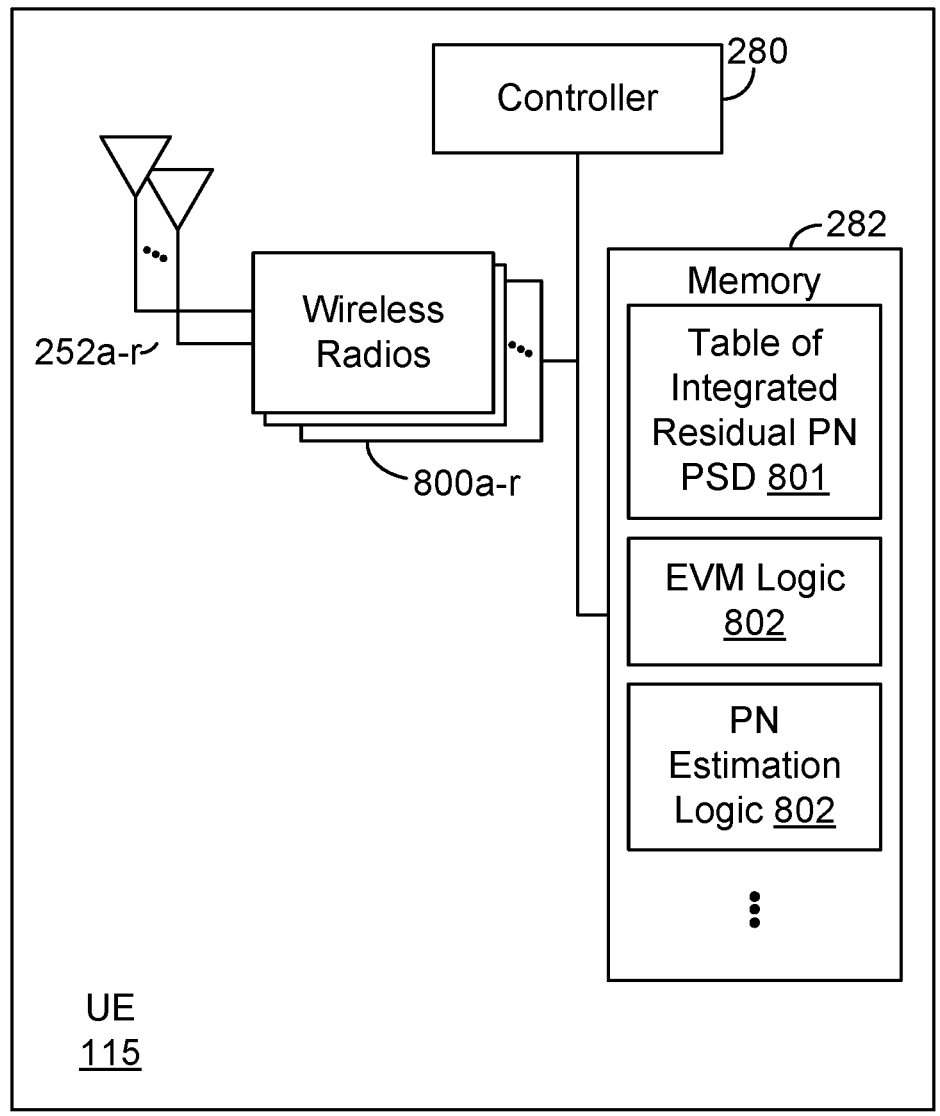
FIG. 8 is a block diagram of an example UE that supports signaling of network entities' phase noise ICI order for reducing UE phase noise cancelation complexity according to one or more aspects.

FIG. 8 is a block diagram of an example UE 115 that supports signaling of network entities' phase noise ICI order for reducing UE phase noise cancelation complexity to one or more aspects. UE 115 may be configured to perform operations, including the blocks of a process described with reference to FIG. 4B. In some implementations, UE 115 includes the structure, hardware, and components shown and described with reference to UE 115 of FIGS. 1-3. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 800*a-r* and antennas 252*a-r*. Wireless radios 800*a-r* include various components and hardware, as illustrated in FIG. 2 for UE 115, including modulator and demodulators 254*a-r*, MIMO detector 256, receive processor 258, transmit processor 264, and TX MIMO processor 266.

As shown, memory 282 may include table of integrated residual phase noise PSD 801, EVM logic 802, and phase noise estimating logic 803. Table of integrated residual phase noise PSD 801 includes a table of integrated residual phase noise PSD received from network entity 105. The table is indexed according to the corresponding phase noise bandwidth, either represented in subcarriers, frequency, or the like. EVM logic 802, when executed by processor 280, implements the functionality for UE 115 to determine a desired EVM for a particular transmission or MCS or uplink transmission, and then select a phase noise bandwidth, from table of integrated residual phase noise PSD 801, in which the corresponding integrated residual phase noise PSD would be considered negligible in relation to the desired EVM. Phase noise estimating logic 803, when executed by processor 280, implements the functionality for UE 115 to estimate the phase noise for a given transmission and cancel that phase noise from the transmission. For example, when network entity 105 transmits data to UE 115, the estimated phase noise determined within the execution environment of phase noise estimating logic 803, is further canceled from the transmitted data. UE 115 may receive signals from or transmit signals to one or more network entities, such as network 105 of FIGS. 1-3 or a network entity 105, as illustrated in FIG. 7.

It is noted that one or more blocks (or operations) described with reference to FIGS. 4A-4B may be combined with one or more blocks (or operations) described with reference to another of the figures. For example, one or more blocks (or operations) of FIG. 4A may be combined with one or more blocks (or operations) of FIG. 5B. As another example, one or more blocks associated with FIG. 4B may be combined with one or more blocks associated with FIG. 6. As another example, one or more blocks associated with FIGS. 4A and 4B may be combined with one or more blocks (or operations) associated with FIGS. 1-3. Additionally, or alternatively, one or more operations described above with reference to FIGS. 1-3 may be combined with one or more operations described with reference to FIG. 7 or 8.

In one or more aspects, techniques for supporting signaling of network entities' phase noise ICI order for reducing UE phase noise cancelation complexity may include additional aspects, such as any single aspect or any combination of aspects described below or in connection with one or more other processes or devices described elsewhere herein. In a first aspect, supporting signaling of network entities' phase noise ICI order for reducing UE phase noise cancelation complexity may include an apparatus configured to obtain a PSD measurement of a phase noise mask of the network entity, measure an integrated residual PSD measurement of the PSD measurement corresponding to each phase noise bandwidth size of a plurality of phase noise bandwidth sizes within the phase noise mask, and transmit the integrated residual PSD measurement corresponding to each phase noise bandwidth size of the plurality of phase noise bandwidth sizes to each UE served by the network entity.

Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, wherein the integrated residual PSD measurement corresponding to each phase noise bandwidth size of the plurality of phase noise bandwidth sizes is transmitted in a table in which the plurality of phase noise bandwidth sizes are represented as subcarriers indexing a corresponding integrated residual PSD measurement.

In a third aspect, alone or in combination with one or more of the first aspect or the second aspect, wherein the at least one processor operable to cause the network entity to transmit is operable to cause the network entity to transmit the integrated residual PSD measurement corresponding to each phase noise bandwidth size of the plurality of phase noise bandwidth sizes to each UE via one of a MAC CE or a RRC signal at a beginning of communications with each UE.

A fourth aspect configured for wireless communication performed by a network entity may include obtaining a PSD measurement of a phase noise mask of the network entity, measuring an integrated residual PSD measurement of the PSD measurement corresponding to each phase noise bandwidth size of a plurality of phase noise bandwidth sizes within the phase noise mask, and transmitting the integrated residual PSD measurement corresponding to each phase noise bandwidth size of the plurality of phase noise bandwidth sizes to each UE served by the network entity.

In a fifth aspect, alone or in combination with the fourth aspect, wherein the integrated residual PSD measurement corresponding to each phase noise bandwidth size of the plurality of phase noise bandwidth sizes is transmitted in a table in which the plurality of phase noise bandwidth sizes are represented as subcarriers indexing a corresponding integrated residual PSD measurement.

In a sixth aspect, alone or in combination with one or more of the fourth aspect or the fifth aspect, wherein the transmitting includes transmitting the integrated residual PSD measurement corresponding to each phase noise bandwidth size of the plurality of phase noise bandwidth sizes to each UE via one of a MAC CE or a RRC signal at a beginning of communications with each UE.

A seventh aspect configured for wireless communication by a network entity may include means for obtaining a PSD measurement of a phase noise mask of the network entity, means for measuring an integrated residual PSD measurement of the PSD measurement corresponding to each phase noise bandwidth size of a plurality of phase noise bandwidth sizes within the phase noise mask, and means for transmitting the integrated residual PSD measurement corresponding to each phase noise bandwidth size of the plurality of phase noise bandwidth sizes to each UE served by the network entity.

In an eighth aspect, alone or in combination with the seventh aspect, wherein the integrated residual PSD measurement corresponding to each phase noise bandwidth size of the plurality of phase noise bandwidth sizes is transmitted in a table in which the plurality of phase noise bandwidth sizes are represented as subcarriers indexing a corresponding integrated residual PSD measurement.

In a ninth aspect, alone or in combination with one or more of the seventh aspect or the eighth aspect, wherein the means for transmitting includes means for transmitting the integrated residual PSD measurement corresponding to each phase noise bandwidth size of the plurality of phase noise bandwidth sizes to each UE via one of a MAC CE or a RRC signal at a beginning of communications with each UE.

A tenth aspect may include a non-transitory computer-readable medium storing instructions. When executed by a processor in a network entity, the instructions may cause the processor to perform operations including obtaining a PSD measurement of a phase noise mask of the network entity, measuring an integrated residual PSD measurement of the PSD measurement corresponding to each phase noise bandwidth size of a plurality of phase noise bandwidth sizes within the phase noise mask, and transmitting the integrated residual PSD measurement corresponding to each phase noise bandwidth size of the plurality of phase noise bandwidth sizes to each UE served by the network entity.

In an eleventh aspect, alone or in combination with the tenth aspect, wherein the integrated residual PSD measurement corresponding to each phase noise bandwidth size of the plurality of phase noise bandwidth sizes is transmitted in a table in which the plurality of phase noise bandwidth sizes are represented as subcarriers indexing a corresponding integrated residual PSD measurement.

In a twelfth aspect, alone or in combination with one or more of the tenth aspect or the eleventh aspect, wherein the transmitting includes transmitting the integrated residual PSD measurement corresponding to each phase noise bandwidth size of the plurality of phase noise bandwidth sizes to each UE via one of a MAC CE or a RRC signal at a beginning of communications with each UE.

In one or more aspects, techniques for supporting signaling of network entities' phase noise ICI order for reducing UE phase noise cancelation complexity may include additional aspects, such as any single aspect or any combination of aspects described below or in connection with one or more other processes or devices described elsewhere herein. In a thirteenth aspect, supporting signaling of network entities' phase noise ICI order for reducing UE phase noise cancelation complexity may include an apparatus configured to receive a communication from a serving network entity that includes an integrated residual PSD measurement corresponding to each phase noise bandwidth size of a plurality of phase noise bandwidth sizes, calculate a desired EVM of an intended uplink transmission, identify a desired integrated residual PSD measurement from the integrated residual PSD measurement associated with the desired EVM, select a desired phase noise bandwidth size from the plurality of phase noise bandwidth sizes corresponding to the desired integrated residual PSD measurement, calculate an estimated phase noise of the serving network entity using the desired phase noise bandwidth size, and cancel the estimated phase noise from transmissions received from the serving network entity.

Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a fourteenth aspect, alone or in combination with the thirteenth aspect, wherein the integrated residual PSD measurement corresponding to each phase noise bandwidth size of the plurality of phase noise bandwidth sizes is received in a table in which the plurality of phase noise bandwidth sizes are represented as subcarriers indexing a corresponding integrated residual PSD measurement.

In a fifteenth aspect, alone or in combination with one or more of the thirteenth aspect or the fourteenth aspect, wherein the at least one processor operable to cause the UE to receive is operable to cause the UE to receive the communication that includes the integrated residual PSD measurement corresponding to each phase noise bandwidth size of the plurality of phase noise bandwidth sizes via one of a MAC CE or a RRC signal at a beginning of communications with the network entity.

A sixteenth aspect configured for wireless communication performed by UE may include receiving a communication from a serving network entity that includes an integrated residual PSD measurement corresponding to each phase noise bandwidth size of a plurality of phase noise bandwidth sizes, calculating a desired EVM of an intended uplink transmission, identifying a desired integrated residual PSD measurement from the integrated residual PSD measurement associated with the desired EVM, selecting a desired phase noise bandwidth size from the plurality of phase noise bandwidth sizes corresponding to the desired integrated residual PSD measurement, calculating an estimated phase noise of the serving network entity using the desired phase noise bandwidth size, and canceling the estimated phase noise from transmissions received from the serving network entity.

In a seventeenth aspect, alone or in combination with the sixteenth aspect, wherein the integrated residual PSD measurement corresponding to each phase noise bandwidth size of the plurality of phase noise bandwidth sizes is received in a table in which the plurality of phase noise bandwidth sizes are represented as subcarriers indexing a corresponding integrated residual PSD measurement.

In an eighteenth aspect, alone or in combination with one or more of the sixteenth aspect or the seventeenth aspect, wherein the receiving includes receiving the communication that includes the integrated residual PSD measurement corresponding to each phase noise bandwidth size of the plurality of phase noise bandwidth sizes via one of a MAC CE or a RRC signal at a beginning of communications with the network entity.

A nineteenth aspect configured for wireless communication by a UE may include means for receiving a communication from a serving network entity that includes an integrated residual PSD measurement corresponding to each phase noise bandwidth size of a plurality of phase noise bandwidth sizes, means for calculating a desired EVM of an intended uplink transmission, means for identifying a desired integrated residual PSD measurement from the integrated residual PSD measurement associated with the desired EVM, means for selecting a desired phase noise bandwidth size from the plurality of phase noise bandwidth sizes corresponding to the desired integrated residual PSD measurement, means for calculating an estimated phase noise of the serving network entity using the desired phase noise bandwidth size, and means for canceling the estimated phase noise from transmissions received from the serving network entity.

In a twentieth aspect, alone or in combination with the nineteenth aspect, wherein the integrated residual PSD measurement corresponding to each phase noise bandwidth size of the plurality of phase noise bandwidth sizes is received in a table in which the plurality of phase noise bandwidth sizes are represented as subcarriers indexing a corresponding integrated residual PSD measurement.

In a twenty-first aspect, alone or in combination with one or more of the nineteenth aspect or the twentieth aspect, wherein the means for receiving includes means for receiving the communication that includes the integrated residual PSD measurement corresponding to each phase noise bandwidth size of the plurality of phase noise bandwidth sizes via one of a MAC CE or a RRC signal at a beginning of communications with the network entity.

A twenty-second aspect may include a non-transitory computer-readable medium storing instructions. When executed by a processor in a UE, the instructions may cause the processor to perform operations including receiving a communication from a serving network entity that includes an integrated residual PSD measurement corresponding to each phase noise bandwidth size of a plurality of phase noise bandwidth sizes, calculating a desired EVM of an intended uplink transmission, identifying a desired integrated residual PSD measurement from the integrated residual PSD measurement associated with the desired EVM, selecting a desired phase noise bandwidth size from the plurality of phase noise bandwidth sizes corresponding to the desired integrated residual PSD measurement, calculating an estimated phase noise of the serving network entity using the desired phase noise bandwidth size, and canceling the estimated phase noise from transmissions received from the serving network entity.

In a twenty-third aspect, alone or in combination with the twenty-second aspect, wherein the integrated residual PSD measurement corresponding to each phase noise bandwidth size of the plurality of phase noise bandwidth sizes is received in a table in which the plurality of phase noise bandwidth sizes are represented as subcarriers indexing a corresponding integrated residual PSD measurement.

In a twenty-fourth aspect, alone or in combination with one or more of the twenty-second aspect or the twenty-third aspect, wherein the receiving includes receiving the communication that includes the integrated residual PSD measurement corresponding to each phase noise bandwidth size of the plurality of phase noise bandwidth sizes via one of a MAC CE or a RRC signal at a beginning of communications with the network entity.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication at a network entity comprising:
   at least one memory; and
   at least one processor coupled with the at least one memory, the at least one processor operable to cause the network entity to:
      obtain a power spectral density (PSD) measurement of a phase noise mask of the network entity;
      measure an integrated residual PSD measurement of the PSD measurement corresponding to each phase noise bandwidth size of a plurality of phase noise bandwidth sizes within the phase noise mask; and
      transmit the integrated residual PSD measurement corresponding to each phase noise bandwidth size of the plurality of phase noise bandwidth sizes to each user equipment (UE) served by the network entity.

2. The apparatus of claim 1, wherein the integrated residual PSD measurement corresponding to each phase noise bandwidth size of the plurality of phase noise bandwidth sizes is transmitted in a table in which the plurality of phase noise bandwidth sizes are represented as subcarriers indexing a corresponding integrated residual PSD measurement.

3. The apparatus of claim 1, wherein the at least one processor operable to cause the network entity to transmit is operable to cause the network entity to transmit the integrated residual PSD measurement corresponding to each phase noise bandwidth size of the plurality of phase noise bandwidth sizes to each UE via one of a medium access control control element (MAC CE) or a radio resource control (RRC) signal at a beginning of communications with each UE.

4. An apparatus for wireless communication at a user equipment (UE) comprising:
   at least one memory; and
   at least one processor coupled with the at least one memory, the at least one processor operable to cause the UE to:
      receive a communication from a serving network entity that includes an integrated residual PSD measurement corresponding to each phase noise bandwidth size of a plurality of phase noise bandwidth sizes;
      calculate a desired error vector magnitude (EVM) of an intended uplink transmission;
      identify a desired integrated residual PSD measurement from the integrated residual PSD measurement associated with the desired EVM;
      select a desired phase noise bandwidth size from the plurality of phase noise bandwidth sizes corresponding to the desired integrated residual PSD measurement;
      calculate an estimated phase noise of the serving network entity using the desired phase noise bandwidth size; and
      cancel the estimated phase noise from transmissions received from the serving network entity.

5. The apparatus of claim 4, wherein the integrated residual PSD measurement corresponding to each phase noise bandwidth size of the plurality of phase noise bandwidth sizes is received in a table in which the plurality of phase noise bandwidth sizes are represented as subcarriers indexing a corresponding integrated residual PSD measurement.

6. The apparatus of claim 4, wherein the at least one processor operable to cause the UE to receive is operable to cause the UE to receive the communication that includes the integrated residual PSD measurement corresponding to each phase noise bandwidth size of the plurality of phase noise bandwidth sizes via one of a medium access control control element (MAC CE) or a radio resource control (RRC) signal at a beginning of communications with the network entity.

7. A method of wireless communication performed by a network entity, the method comprising:
   obtaining a power spectral density (PSD) measurement of a phase noise mask of the network entity;
   measuring an integrated residual PSD measurement of the PSD measurement corresponding to each phase noise bandwidth size of a plurality of phase noise bandwidth sizes within the phase noise mask; and
   transmitting the integrated residual PSD measurement corresponding to each phase noise bandwidth size of the plurality of phase noise bandwidth sizes to each user equipment (UE) served by the network entity.

8. The method of claim 7, wherein the integrated residual PSD measurement corresponding to each phase noise bandwidth size of the plurality of phase noise bandwidth sizes is transmitted in a table in which the plurality of phase noise bandwidth sizes are represented as subcarriers indexing a corresponding integrated residual PSD measurement.

9. The method of claim 7, wherein the transmitting includes transmitting the integrated residual PSD measurement corresponding to each phase noise bandwidth size of the plurality of phase noise bandwidth sizes to each UE via one of a medium access control control element (MAC CE) or a radio resource control (RRC) signal at a beginning of communications with each UE.

* * * * *